United States Patent [19]
Cline et al.

[11] Patent Number: 5,704,009
[45] Date of Patent: Dec. 30, 1997

[54] METHOD AND APPARATUS FOR TRANSMITTING A VOICE SAMPLE TO A VOICE ACTIVATED DATA PROCESSING SYSTEM

[75] Inventors: Troy Lee Cline, Cedar Park; Scott Harlan Isensee, Georgetown; Ricky Lee Poston, Austin, all of Tex.; Jon Harald Werner, Oceanside, Calif.

[73] Assignee: International Business Machines Corporation, Armonk, N.Y.

[21] Appl. No.: 497,302

[22] Filed: Jun. 30, 1995

[51] Int. Cl.⁶ .................................................... G10L 9/06
[52] U.S. Cl. .................. 395/2.84; 395/2.1; 395/2.16; 395/2.55; 395/2.6; 395/2.79
[58] Field of Search ................................. 395/2.09, 2.1, 395/2.17, 2.4, 2.84, 2.55, 2.6, 2.79, 2.16

[56] References Cited

U.S. PATENT DOCUMENTS 5,444,673  8/1995  Mathurin ................................. 368/63

FOREIGN PATENT DOCUMENTS

0633520A1  1/1995  European Pat. Off. .

*Primary Examiner*—Allen R. MacDonald
*Assistant Examiner*—Alphonso A. Collins
*Attorney, Agent, or Firm*—Diana L. Roberts; Richard A. Henkler; Andrew J. Dillon

[57] ABSTRACT

An apparatus and method transmit analyzed voice samples from a wireless transmitting device worn by a user to a remote voice activated data processing system having a speech recognition system stored thereon. The method includes the first step of storing voice characteristics of a user into a memory (e.g. a RAM chip) on a wireless transmitting device. The second step includes voice activating the transmitting device and speech recognition system. After the transmitting device and speech recognition system have been activated, the third step includes transmitting the voice characteristics from the memory to the speech recognition system, thereby enabling the user to verbally communicate directly with the voice activated data processing system.

11 Claims, 4 Drawing Sheets

METHOD AND APPARATUS FOR TRANSMITTING A VOICE SAMPLE TO A VOICE ACTIVATED DATA PROCESSING SYSTEM

BACKGROUND OF THE INVENTION

1. Field of the Invention

The present invention relates to improvements in communicating with speech recognition systems and, more particularly, but without limitation, to a method and apparatus for transmitting voice samples to a speaker dependent speech recognition system of a data processing system.

2. Background Information and Description of the Related Art

The spoken word plays an important role in human communications and in human-to-machine and machine-to-human communications. For example, modern voice mail systems, help systems, and video conferencing systems incorporate human speech. Moreover, as technology continues to evolve, human speech will play an even bigger role in machine/human communications. Specifically, envision a wireless ATM machine (or any wireless machine type, such as a gas pump, travel information kiosk, point of sale terminal) incorporating a speech recognition system, whereby the user merely talks to the ATM machine. The present invention contemplates a user easily and efficiently verbally communicating with such a machine without having to insert cards or any other type of device into the machine. However, some additional background information should first be discussed.

Conventional speech recognition systems "listen to" and understand human speech. However, to have acceptable voice recognition accuracy, conventional speech recognition systems utilize a stored voice sample of the user. The user generates the voice sample by reciting approximately 30 carefully structured sentences that capture sufficient voice characteristics. Voice characteristics contain the prosody of the user's voice, including cadence, pitch, inflection, and speed. A conventional speech analyzer processes the voice sample to isolate the audio samples for each diphone segment and to determine characteristic prosody curves. The speech analyzer uses well known digital signal processing techniques, such as hidden Markov models, to generate the diphone segments and prosody curves. Therefore, with a stored voice sample, conventional speech recognition systems have about a 90% accuracy rate. However, it would be extremely disadvantageous to repeat those 30 sentences each time a user desires to verbally communicate with a wireless machine.

Given this background information, it would be extremely desirable and beneficial for a large number of users to efficiently, effectively and remotely communicate through speech with a wireless interactive machine. However, a technique or apparatus must be developed that transmits an analyzed voice sample of the user to the machine before the user can verbally communicate with the machine with a high accuracy rate.

SUMMARY

An apparatus and computer-implemented method transmit analyzed voice samples from a wireless transmitting device worn by a user to a remote data processing system having a speech recognition system reading thereon. The method includes the first step of storing a set of voice characteristics of a user into a memory (e.g. a RAM chip) of a wireless transmitting device). The second step includes voice activating the transmitting device and the remote speech recognition system in response to a voice command. After the transmitting device and speech recognition system have been activated, the third step includes automatically and remotely transmitting the voice characteristics from the memory to the speech recognition system, thereby enabling the user to verbally communicate directly with the voice activated data processing system.

Therefore, it is an object of the present invention to provide an improved voice transmission system that automatically transmits the user's voice characteristics to a wireless data processing system in response to a predefined voice command.

It is a further object to provide an apparatus (e.g., transmitting device) for storing and transmitting the user's voice characteristics to the data processing system.

It is yet another object to provide the apparatus for activating the data processing system to wait and receive the voice characteristics.

These and other objects, advantages, and features will become even more apparent in light of the following drawings and detailed description.

DETAILED DESCRIPTION OF THE PREFERRED EMBODIMENT

The preferred embodiment includes a method and apparatus for remotely and automatically transmitting a voice sample containing a user's voice characteristics to a speech recognition system.

Figure 1:
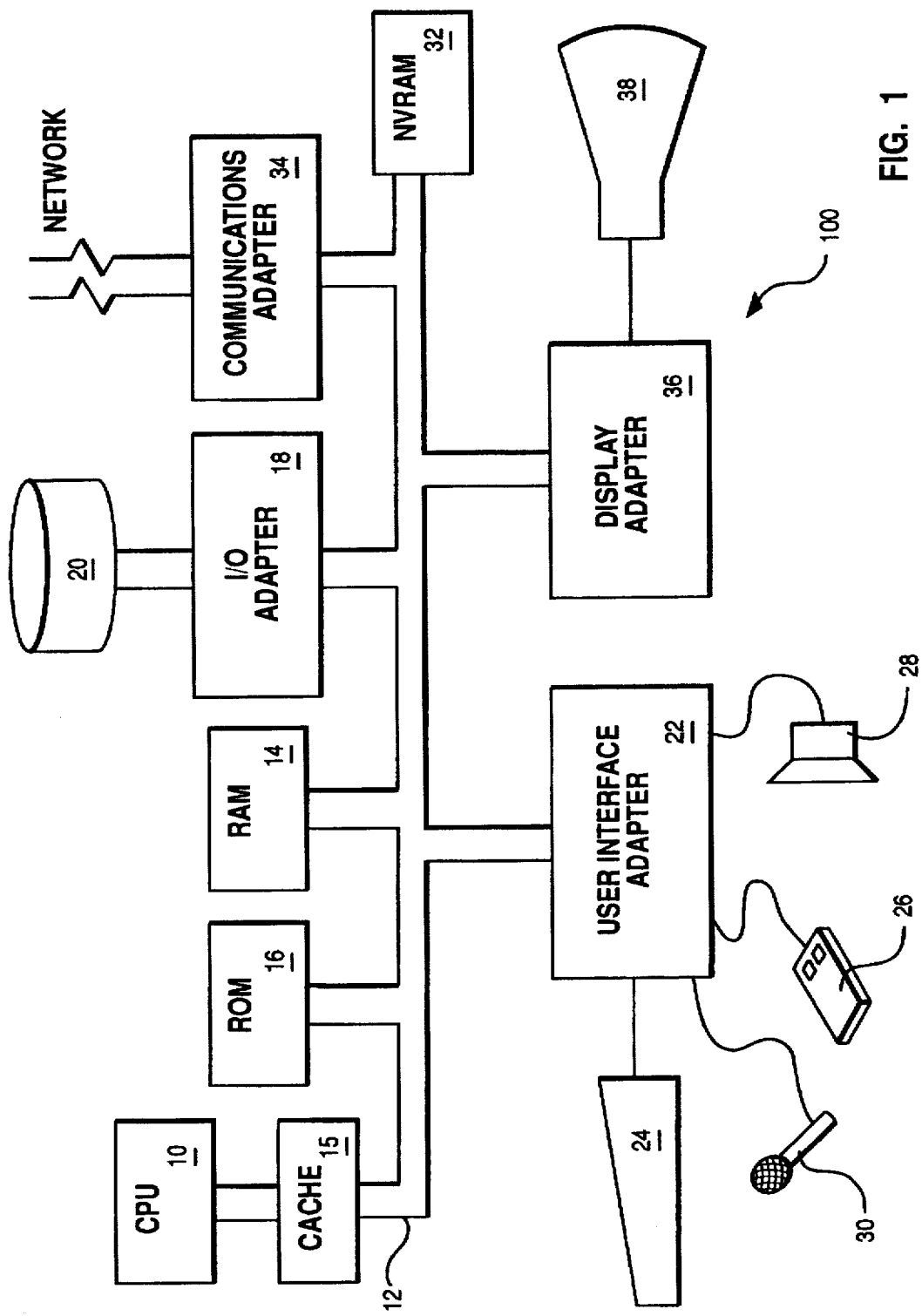
FIG. 1 illustrates a block diagram of a representative hardware environment for implementing the present invention.

The preferred embodiment is practiced in a laptop computer or, alternatively, in the workstation illustrated in FIG. 1. Workstation 100 includes central processing unit (CPU) 10, such as IBM's™ PowerPC™ 601 or Intel's™ 486 microprocessor for processing cache 15, random access memory (RAM) 14, read only memory 16, and non-volatile RAM (NVRAM) 32. One or more disks 20, controlled by I/O adapter 18, provide long term storage. A variety of other storage media may be employed, including tapes, CD-ROM, and WORM drives. Removable storage media may also be provided to store data or computer process instructions.

Instructions and data from the desktop of any suitable operating system, such as Sun Solaris™, Microsoft Windows NT™, IBM OS/2™, or Apple MAC OS™, control CPU 10 from RAM 14. However, one skilled in the art readily recognizes that other hardware platforms and operating systems may be utilized to implement the present invention.

Users communicate with workstation 100 through I/O devices (i.e., user controls) controlled by user interface adapter 22. Display 38 displays information to the user, while keyboard 24, pointing device 26, transmitting device 30, and speaker 28 allow the user to direct the computer system. Alternatively, additional types of user controls may be employed, such as a joy stick, touch screen, or virtual reality headset (not shown). Communications adapter 34 controls communications between this computer system and other processing units connected to a network. Display adapter 36 controls communications between this computer system and display 38.

Figure 2:
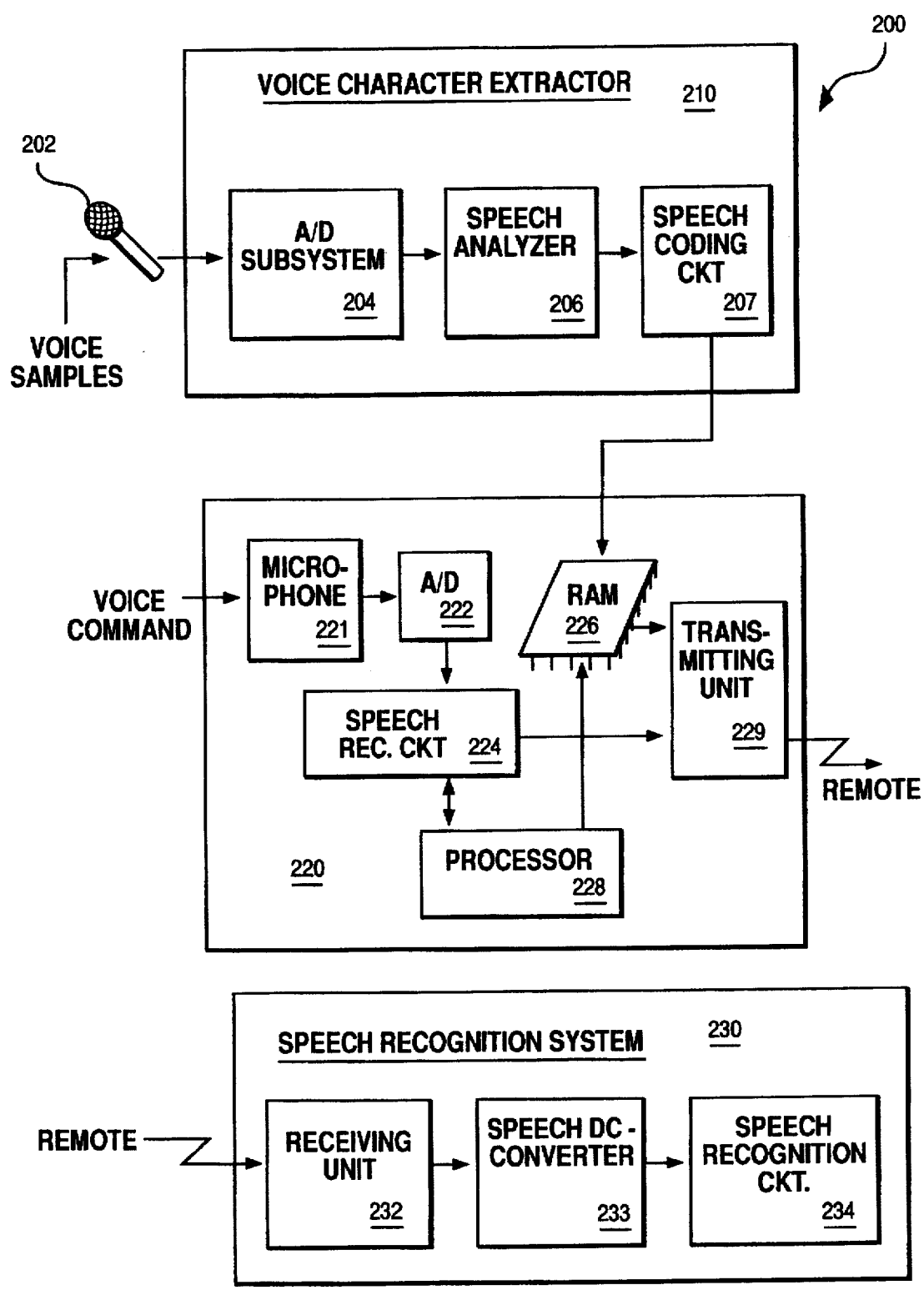
FIG. 2 illustrates a block diagram of an improved voice transmission system in accordance with the present invention.

FIG. 2 illustrates a block diagram of a complete voice transmission system 200 in accordance with the preferred embodiment. Transmission system 200 includes voice character extractor 210, transmitting device (also referred to as apparatus) 220, and speech recognition system 230. Voice character extractor 210 resides within any suitable workstation, such as workstation 100 (see FIG. 1), and includes A/D subsystem 204, speech analyzer 206, and speech compression circuit 207.

Figure 4:
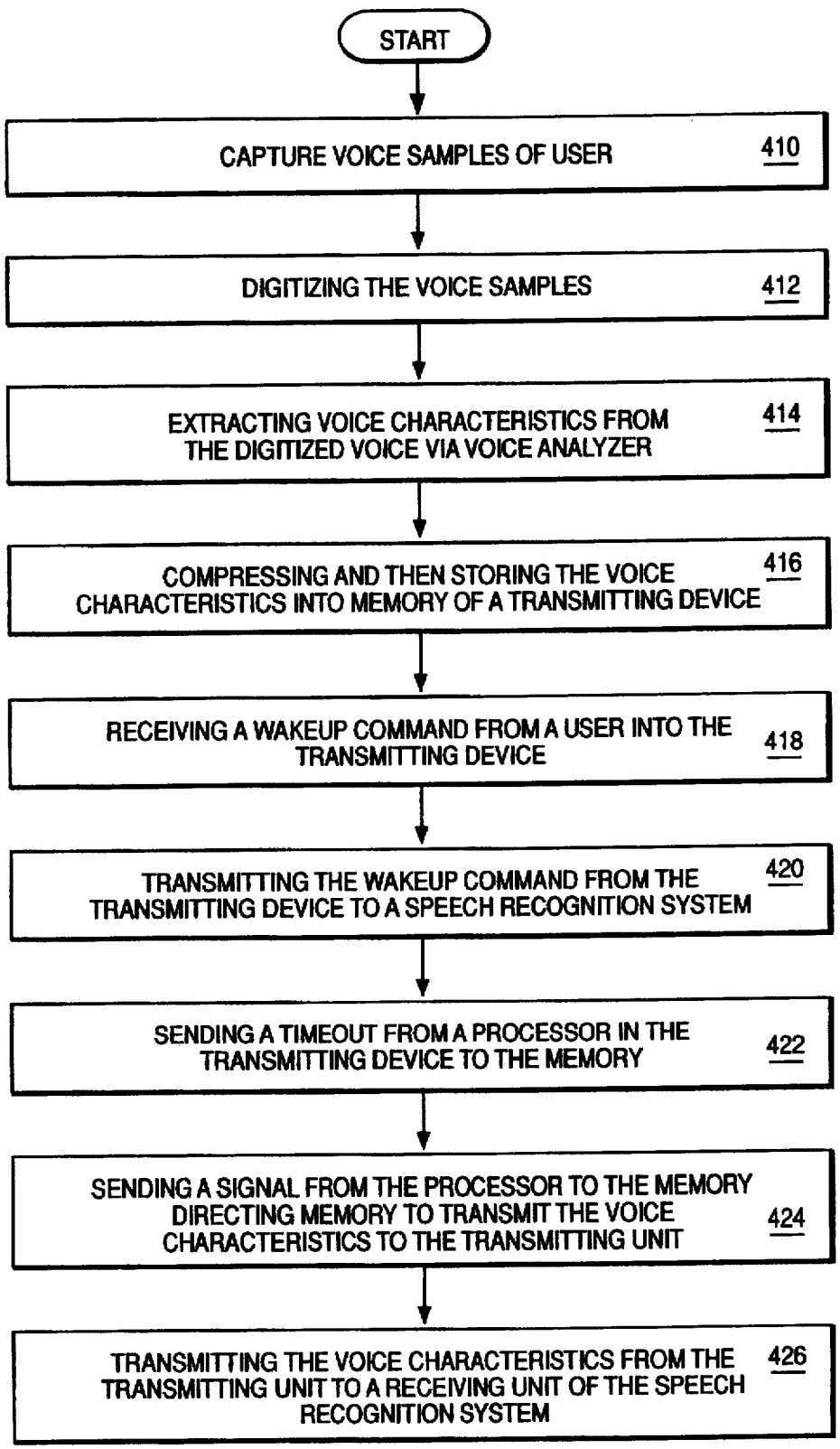
FIG. 4 illustrates a flow diagram for transmitting voice characteristics from a wireless transmitting device to a remote data processing system.

FIG. 4 illustrates a flow diagram for transmitting voice characteristics from a wireless transmitting device to a remote data processing system. Referring to FIGS. 2 and 4, in the preferred embodiment, the user annunciates a voice sample (e.g., about 30 sentences) containing sufficient voice characteristics of the speaker into microphone 202 (step 410). Voice characteristics include the prosody of the voice, such as cadence, pitch, inflection, and speed. Sentences of this type are well known to those skilled in the speech synthesis art. For example, one sentence may be "The quick fox jumped over the lazy brown dog." A/D subsystem 204 (and 222) samples and digitizes the voice samples and includes any suitable analog-to-digital system, such as an IBM MACPA (i.e., Multimedia Audio Capture and Playback Adapter), Creative Labs Sound Blaster audio card or single chip solution (step 412).

In turn, any suitable conventional speech analyzer 206 processes the digitized voice samples to isolate audio samples for each diphone segment and to determine characteristic prosody curves (step 414). Speech analyzer 206 uses well known digital signal processing techniques, such as hidden Markov models, to generate the diphone segments and prosody curves. U.S. Pat. Nos. 4,961,229 and 3,816,722 describe suitable speech analyzers.

Speech coding circuit 207 utilizes conventional digital coding techniques to compress the diphone segments and prosody curves, thereby decreasing transmission bandwidth and storage requirements (step 416). Speech coding circuit 207 stores the resultant compressed prosody curves and diphone segments in RAM 226 (e.g., memory) of transmitting device 220. One skilled in the art recognizes that any suitable type of memory device may be substituted for RAM 226, such as pipeline burst memory, flash memory, or reduced size DASD. Transmitting device 220 also includes voice activated microphone 221 for receiving a voice activation command, A/D subsystem 222, speech recognition circuit 224, a power supply (not shown), processor 228, and transmitting unit 229.

Figure 3:
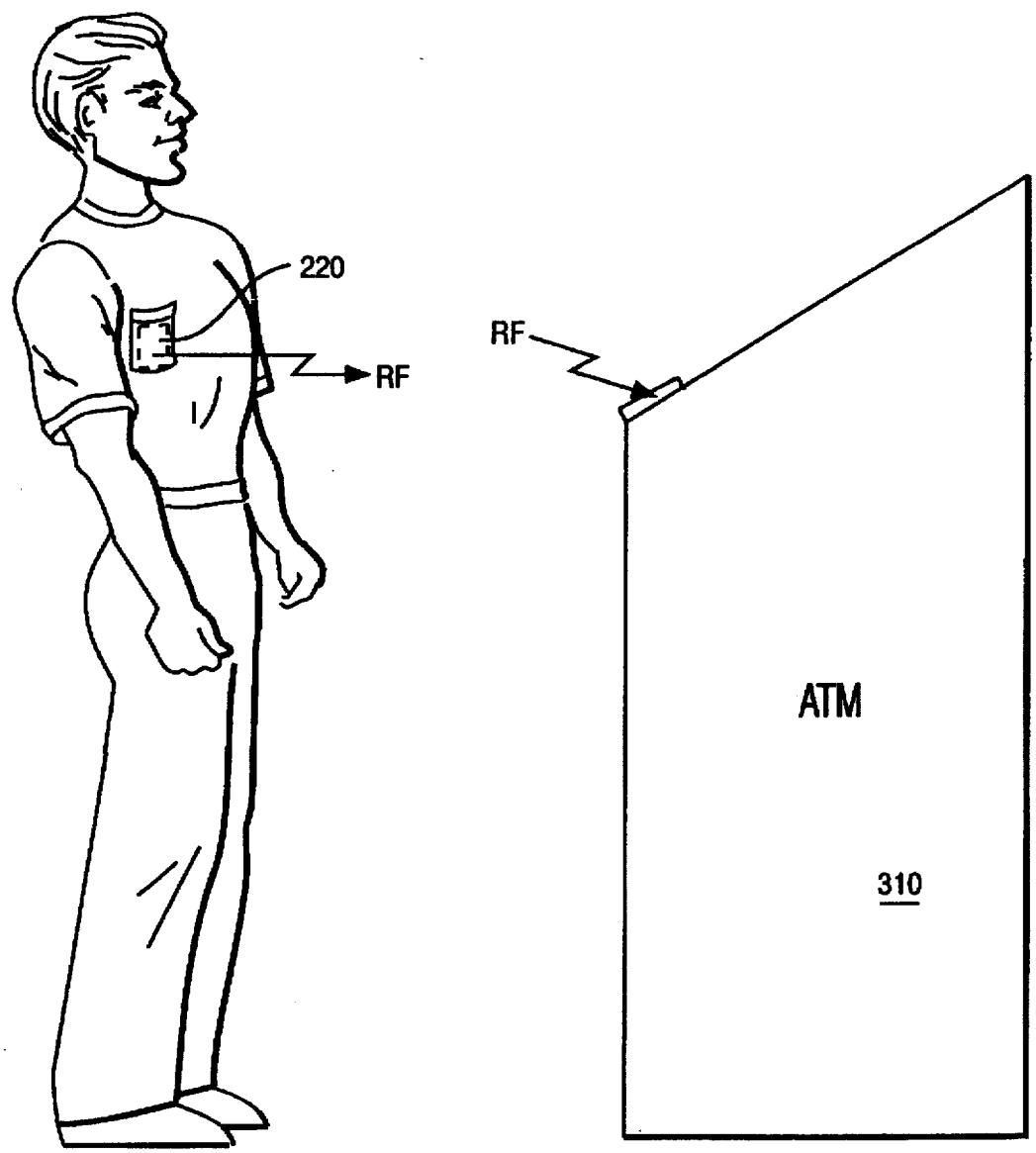
FIG. 3 illustrates a diagram of a user wearing a wireless transmitting device to communicate with a remote data processing system.

FIG. 3 illustrates a diagram of a user wearing wireless transmitting device 220 to communicate with a remote data processing system 310. Referring to FIGS. 2, 3 and 4, in the preferred embodiment, the user wears transmitting device 220, similar to wearing a brooch. Alternatively, the user could hold transmitting device 220 to his/her mouth. When the user desires to communicate with speech recognition system 230 residing on remote data processing system (e.g., an ATM machine) 310, the user (who is wearing transmitting device 220) approaches remote data processing system 310 and recites a voice activation command (e.g., "COMPUTER"; "LOGON COMPUTER") into voice activated microphone 221 of transmitting device 220 (step 418). It is important to note that "wireless" means that data processing system 310 is wireless with respect to transmitting device 220. Voice activated microphone 221 detects the voice activation command and A/D subsystem 222 samples and digitizes that voice activation command. A/D subsystem 222 sends the digitized voice activation command to speech recognition circuit 224.

Speech recognition circuit 224 (and 234) includes any suitable voice recognition circuit, such as the voice recognition circuit in the IBM Voicetype Dictation™ product or the Dragon Voice Recognition System. If speech recognition circuit 224 recognizes the voice activation command, it sends a signal indicating so to processor 228. In response, processor 228 sends a signal to transmitting unit 229 to transmit the voice activation command to receiving unit 232 of speech recognition system 230 (step 420). Transmitting unit 229 may be any suitable type of wireless transmission unit (e.g., laser, infrared light emitting diode); however, in the preferred embodiment, transmitting unit 229 is an RF transmitter. processor 228 sends a short timeout signal to RAM 226 to allow speech recognition system 230 to be awakened (step 422).

Speech recognition system 230 includes receiving unit 232, speech decompression circuit 233, and speech recognition circuit 234, and resides in any suitable workstation, such as workstation 100. Receiving unit 232 sends the received voice activation command to speech decompression circuit 233, where it is decompressed. Speech decompression circuit 233 sends the voice activation command to voice recognition circuit 234. If speech recognition circuit 234 recognizes the speech activation command, it is activated and waits to receive the prosody curves and diphone segments from the transmitting device 220. Accordingly, the single voice activation command activates transmitting device 220 and speech recognition system 230. Therefore, after a short timeout, processor 228 directs RAM 226 to send via transmitting unit 229 and receiving unit 232 the prosody curves and diphone segments to speech recognition circuit 234 (step 424 and 426). Speech recognition circuit 234 uses those prosody curves and diphone segments to recognize the user's voice. The user may now speak directly to speech recognition system 230.

Accordingly, the preferred embodiment transmits the user's voice characteristics to a wireless remote machine without the user having to do anything other than recite a voice activation command. No cards need be inserted. Therefore, the user can simultaneously activate more than one wireless remote data processing system, which could not be accomplished by inserting a card.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A method of improved communication between a user and at least one of a plurality of diverse speech-recognizing data processing systems, utilizing a wireless transmitting device including a processor and memory, said method comprising the steps of:

storing, within said memory of said wireless transmitting device, voice characteristics of said user, said voice characteristics including prosody curves;

activating said wireless transmitting device and a speech recognition system within said at least one of a plurality of diverse, speech-recognizing data processing systems in response to an input from said user;

transmitting said voice characteristics from said memory to said speech recognition system in response to said activating step; and facilitating communication between said user and said at least one of a plurality of diverse, speech-recognizing data processing systems through said speech recognition system utilizing a spoken utterance of said user and said voice characteristics.

2. The method according to claim 1 wherein said storing step comprises the steps of:

capturing a voice sample of said user;

digitizing said captured voice sample;

extracting said voice characteristics from said voice sample utilizing a speech analyzer; and storing said voice characteristics in said memory.

3. The method according to claim 1 wherein said activating step comprises the steps of:

receiving by said wireless transmitting device, said voice activation command from said user to activate said wireless transmitting device; and transmitting said voice activation command from said wireless transmitting device to said speech recognition system to activate said speech recognition system.

4. The method according to claim 3 wherein said activating step further comprises the step of:

sending a signal from said processor to said memory within said wireless transmitting device to allow said speech recognition system to become active before transmitting said voice characteristics.

5. The method according to claim 1 wherein said transmitting step comprises the step of:

sending a signal from said processor to said memory within said wireless transmitting device to transmit said voice characteristics to said speech recognition system.

6. The method according to claim 1 wherein said activating step comprises:

activating said wireless transmitting device and a speech recognition system within said at least one of a plurality of diverse, speech-recognizing data processing systems in response to a voice activation command.

7. A system for improved communication between a user and at least one of a plurality of diverse, speech-recognizing data processig systems, said system comprising:

means for storing, within said memory of said wireless transmitting device, voice characteristics of said user, said voice characteristics including prosody curves;

means for activating said wireless transmitting device and a speech recognition system within said at least one of a plurality of diverse, speech-recognizing data processing systems in response to an input from said user;

means for transmitting said voice characteristics from said wirless transmitting device to said speech recognition system in response to said activating means; and means for facillitating communication between said user and said at least one of a plurality of diverse, speech-recognizing data processing systems through said speech recognition system utilizing a spoken utterance from said user and said voice characteristics.

8. The system according to claim 7 further comprising:

means for generating said voice characteristics from a voice sample of said user.

9. The system according to claim 7 wherein said wireless transmitting device comprises:

a microphone for receiving said voice activation command, a speech recognition circuit for recognizing said voice activation command, and a transmitting unit for transmitting said voice activation command and said voice characteristics to said speech recognition system.

10. The system according to claim 9 wherein said transmitting unit comprises an RF transmitter.

11. The system according to claim 9 wherein said wireless transmitting device further comprises a processor for controlling said memory and said transmitting unit.

* * * * *